United States Patent [19]
Tamura et al.

[11] Patent Number: 5,241,324
[45] Date of Patent: Aug. 31, 1993

[54] IMAGE PRINTING METHOD FOR EDGE EMISSION TYPE EL PRINTER

[75] Inventors: Toshiyuki Tamura; Masaru Mochizuki; Kaname Iga; Takashi Kikuchi, all of Shizuoka, Japan

[73] Assignee: Tokyo Electric Co., Ltd., Tokyo, Japan

[21] Appl. No.: 509,764

[22] Filed: Apr. 17, 1990

[30] Foreign Application Priority Data

Apr. 17, 1989 [JP] Japan ................................ 1-97082
Oct. 27, 1989 [JP] Japan ................................ 1-280417

[51] Int. Cl.$^5$ .................... G01D 9/42; G01D 15/14; H04N 1/29
[52] U.S. Cl. ................................ 346/1.1; 346/107 R; 358/298
[58] Field of Search ............................ 346/107 R, 1.1; 358/296, 298, 300

[56] References Cited

U.S. PATENT DOCUMENTS

| | | | |
|---|---|---|---|
| 4,074,318 | 2/1978 | Kapes, Jr. | 358/302 X |
| 4,455,578 | 6/1984 | Fearnside | 358/302 |
| 4,460,909 | 7/1984 | Bassetti et al. | 358/298 X |
| 4,535,341 | 8/1985 | Kun et al. | 346/107 R |
| 4,544,264 | 10/1985 | Bassetti et al. | 358/300 X |
| 4,563,693 | 1/1986 | Masaki | 358/298 |
| 4,625,222 | 11/1986 | Bassetti et al. | 358/300 X |
| 4,689,694 | 8/1987 | Yoshida | 358/298 |
| 4,783,667 | 11/1988 | Brooks | 346/76 PH |
| 4,807,047 | 2/1989 | Sato et al. | 358/300 |
| 4,814,886 | 3/1989 | Kuge et al. | 358/298 X |
| 4,914,459 | 4/1990 | Mama et al. | 346/160 |
| 4,918,462 | 4/1990 | Tomita et al. | 346/107 R |
| 4,933,686 | 6/1990 | Izumi et al. | 358/298 X |

FOREIGN PATENT DOCUMENTS

| | | |
|---|---|---|
| 3843645 | 7/1989 | Fed. Rep. of Germany . |
| 60-5387 | 1/1985 | Japan . |
| 61-286866 | 12/1986 | Japan . |
| 63-103288 | 5/1988 | Japan . |
| 64-27945 | 1/1989 | Japan . |
| 1-85846 | 6/1989 | Japan . |

OTHER PUBLICATIONS

J. P. Mantey and L. E. Rittenhouse, "Cascadeable Linear LED Array Module", *IBM Technical Disclosure Bulletin*, vol. 24, No. 10, Mar. 1982, pp. 5034–5037.
R. S. Colby, "Improvement of Digital Typeface Printing", *IBM Technical Disclosure Bulletin*, vol. 27, No. 9, Feb. 1985, pp. 5047–5048.

*Primary Examiner*—Benjamin R. Fuller
*Assistant Examiner*—David Yockey
*Attorney, Agent, or Firm*—Oblon, Spivak, McClelland, Maier & Neustadt

[57] ABSTRACT

Disclosed herein is an image printing method whereby a line head of a line printer performs line emission a plurality of times to print one primary scanning line. The number of times light is emitted by each edge emission type EL device corresponding to each pixel of one primary scanning line is controlled according to print density information contained in an input print signal. A plurality of flat pixel components are generated lengthwise and crosswise to form an approximately square pixel. This pixel is printed a plurality of times lengthwise and crosswise to form an image. The edges of the image are filled with suitably positioned pixels that have some of their components selectively left blank for visually smoothing effects.

5 Claims, 13 Drawing Sheets

(1, 1)

(1, 0)

(0, 1)

(0, 0)

(1, 0)

(0, 1)

IMAGE PRINTING METHOD FOR EDGE EMISSION TYPE EL PRINTER

FIELD OF THE INVENTION AND RELATED ART STATEMENT

The present invention relates to an areal gradation printing method for use with an edge emission type EL (electroluminescent) printer having a line head constituted by an array of edge emission type EL devices.

In recent years, improvements in electrophotographic printers have been paralleled by the development of diverse light-emitting devices. One of such devices is the electroluminescent (EL) device which, despite its various benefits, has been know for its often insufficient levels of luminous intensity. The disadvantage is now compensated by the development of the so-called edge emission type EL device that has turned out to be about 100 times as intense in emission as conventional EL devices. The edge emission type EL device has an optical waveguide constituted by wrapping a thin film active layer with dielectric layers. A flatly polarized beam of light is emitted from an edge of the active layer. The luminance of the device is high enough to justify growing expectations for its possible use in various applications including the printer head.

A prior art printer that uses edge emission type EL devices of the construction outlined above will now be described by referring to FIGS. 10 and 11. FIG. 11 illustrates the construction of an edge emission type EL device 2 for use with a line printer 1 which is an edge emission type EL printer. The EL device 2 has a thin film active layer 3 that contains zinc sulfide including active elements sandwiched from above and below with dielectric layers 4 and 5, respectively. The layers 4 and 5 are in turn covered from above and below with flat electrodes 6 and 7, respectively. In the line printer 1, a plurality of edge emission type EL devices 2 of the above-described construction are positioned side by side to form an array using thin film technology, thereby constituting a line head 8 (FIG. 10). The line head 8 is located adjacent to a photosensitive body, not shown, such as a photosensitive drum.

This applicant proposed that the line head 8 is to be connected to a driving circuit, not shown, as illustrated in FIG. 12. That is, blocks each comprising four EL devices have "n" block electrodes $10_1$ through $10_n$ that are connected in matrix pattern to four common electrodes $9_1$ through $9_4$.

The line printer 1 of the above-described construction causes the edge emission type EL devices 2 of the line head 8 to selectively luminesce in order to produce an electrostatic latent image on the photosensitive body 100 (drum), as shown in FIG. 24, for printing by electrophotography. The line printer 1 regards four edge emission type EL devices as a single block. The four common electrodes $9_1$ through $9_4$ are connected to each of the "n" block electrodes $10_1$ through $10_n$, the two groups of electrodes carrying out primary scanning in synchronization. That is, as depicted in FIG. 13, the block electrodes $10_1$ through $10_n$ are scanned relative to the first to the fourth common electrodes $9_1$ through $9_4$, consecutively in that order. If the scanning time required for scanning relative to each of the common electrodes $9_1$ through $9_4$ is $T_1$, one primary scanning line is formed within the time period of $$T_0 = T_1 \times 4$$

The line printer 1 simplifies its wiring by grouping the many edge emission type EL devices 2 into blocks of four. Within each block, however, the first dot is out of timing with the fourth by as long as $3\ T_1$. This discrepancy results in printed lines which are inclined in each block and of which edges are serrated, lowering the quality of printed images. Each of the printed dots is either solid black or white. To express intermediate degrees of print density requires the use of areal gradation methods such as dithering. The dithering method involves establishing a threshold value matrix, with each of the pixels in the matrix pattern assigned a different threshold value. The threshold value of each pixel in the threshold matrix is compared in density with the corresponding pixel of the image to be reproduced in areal gradation. Dots are determined to be either black or white so that intermediate degrees of print density are expressed in approximation. However, such areal gradation methods necessarily entail deteriorated levels of resolution and hence low levels of image quality.

Another prior art driving method for line printers will now be described by referring to FIGS. 15 and 16. As illustrated in FIG. 16, each edge emission type EL device 12 of a line head 11 has a thin film active layer 13 that contains zinc sulfide and some active elements sandwiched from above and below with dielectric layers 14 and 15, respectively. The layers 14 and 15 are in turn covered from above and below with flat electrodes 16 and 17, respectively. A flatly polarized beam of light is emitted from an edge of the active layer 13. The emission of this EL device can be as intense as 100 times that of other conventional EL devices that emit light from their tops instead of from their edges. As depicted in FIG. 15, the line head 11 is constituted by arranging edge emission type EL devices 12 of the above-described construction, by use of thin film technology, side by side on a substrate 18 along with a rod lens array, not shown.

Illustratively, the line head 11 may have each of its edge emission type EL devices 12 connected to an AC power source 19 via a switching means. Then the line head 11, together with a charging machine, a developing machine and a transfer machine, may be positioned adjacent to a photosensitive body (drum) to form an electrophotographic line printer, not shown. One disadvantage of this line printer is that because each edge emission type EL device incorporated therein has a very large aspect ratio for its outgoing beam of light that is flat in shape, a means is required to compensate for the flatly polarized beam of light.

A solution to this problem is an apparatus disclosed by this applicant in Japanese Patent Appl. No. 1-97081. This apparatus is a prior art line printer which will now be discussed by referring to FIGS. 17 through 23. In this edge emission type EL printer 20, an interface 22 is connected to a timing controller 27 via a control circuit 26 to which two address counter 23 and 24 and a reference clock generator 25 are connected. The interface 22 is also connected, via a first data processing circuit 34, to two RAM's 32 and 33 which are line memories whose inputs and outputs are connected to three-state circuits 28 through 31. To the RAM's 32 and 33 are connected the control circuit 26 and the address counters 23 and 24 via a selector 35. The RAM's 32 and 33 are further connected, via the three-state circuits 30 and 31, to a second data processing circuit 36 to which the timing controller 27 is connected. The second data processing circuit 36 is connected in parallel to shift registers $41_1$ through $41_m$ which are connected to block electrodes $40_1$ through $40_n$ of a line head 39 via latches $37_1$ through $37_m$ and drivers $38_1$ through $38_m$. The timing controller 27 is connected to a common driver 43, to the latches $37_1$ through $37_m$ and to the shift registers $41_1$ through $41_m$, the common driver being connected to common electrodes $42_1$ through $42_m$ of the line head 39. In addition, the line head 39 comprises m×n edge emission type EL devices 12 arranged contiguously.

Constructed as described above, the edge emission type EL printer 20 admits print data including clock pulses from a printer controller 21 via the interface 22. The data thus input is compressed per primary scanning line through rearrangement or other techniques by the first data processing circuit 34.

The compressed data is stored temporarily in either the RAM 32 or the RAM 33 during the time required to print one primary scanning line. At the same time, the print data temporarily stored beforehand in the other RAM is output therefrom at high speed.

The RAM 32 or 33 for temporary storage of print data is selected by the selector 35 operating in accordance with timing pulses that the printer controller 21 inputs to the address counter 23. The print data is output from the RAM 32 or 33 by the control circuit 26 and the address counter 24, the circuit and the counter operating in synchronization with a high-speed data output reference clock signal generated by the reference clock generator 25.

The print data thus output is again processed by the second data processing circuit 36 into a format that is fit for printing. The processed data is output serially to the shift registers $41_1$ through $41_j$ (j=mn/A) and is held by the latches $37_1$ through $37_m$. With the parts 41 and 37 as well as the common driver 43 under control by the timing controller 27, the block electrodes $40_1$ through $40_n$ as well as the common electrodes $42_1$ through $42_m$ each output a predetermined number of high- and low-voltage driving pulses to the line head.

At this point, each edge emission type EL device 12 is made to trigger or suppress its light emission depending on the voltage of driving pulses being above or below a threshold voltage $V_{TH}$ set for the EL device 12. That is, as shown in the timing chart of FIG. 19, the edge emission type EL printer 20 supplies the common electrodes $42_1$ through $42_m$ and the block electrodes $40_1$ through $40_n$ with high- and low-voltage driving pulses which are asymmetrical in amplitude. These pulses are controlled in terms of synchronization so as to vary the voltage across each EL device. This arrangement causes the edge emission type EL devices 12 to trigger or suppress their light emissions as needed.

As depicted in the timing chart of FIG. 20, the edge emission type EL printer 20 performs the above-described process four times during the time $T_0$ required to print one primary scanning line. The line head 39 repeats its line emission four times to address the width of one primary scanning line. A single emission from each edge emission type EL device 12 forms a flat pixel component which in turn is repeated in the secondary scanning direction to print an approximately square pixel. As shown in FIG. 21, the primary scanning line thus printed has the serration at its edge minimized, thus attaining a high level of print quality and preventing the formation of spurious white spots in the secondary scanning direction.

Because the line head 39 repeats its line emission a plurality of times to form one primary scanning line, the edge emission type EL printer 20 can generate approximately square pixels even when the outgoing light from each edge emission type EL device 12 is flatly polarized.

One disadvantage of the EL printer 20 described above is that the printed image has its inclined edges recognizably serrated in units of pixels, as shown in FIG. 22. Likewise, where a circle font is generated in a 10×10 pixel matrix, the resulting image has its inclined edges also visually serrated (FIG. 23); a poor continuity is also recognizable between line segments.

OBJECT AND SUMMARY OF THE INVENTION

It is therefore an object of the present invention to provide an image printing method whereby an edge emission type EL printer expresses intermediate degrees of print density without lowering the resolution of printing.

It is another object of the present invention to provide an image printing method whereby an edge emission type EL printer expresses a large number of grades of intermediate print density.

It is a further object of the present invention to provide an image printing method whereby an edge emission type EL printer readily prints images of high quality by suitably smoothing the edge portions thereof.

According to one aspect of the present invention, an image printing method is provided for use with an edge emission type EL printer that operates on the electrophotography principle. The EL printer comprises a line head constituted by m×n edge emission type EL devices wired in matrix pattern to "m" common electrodes and "n" block electrodes. A photosensitive body is positioned adjacent to the line head so that the body continuously moves relative to the line head for secondary scanning. Upon admitting a print signal, the line head performs dot emission for primary scanning. According to this image printing method, the line head performs line emission a plurality of times to form one primary scanning line. The emission count for the edge emission type EL device corresponding to each pixel of the primary scanning line is controlled in accordance with the density information contained in the input print signal. In the manner outlined above, this method allows a plurality of dots to be printed within each of the pixels forming an image, thereby expressing intermediate degrees of print density based on the black and white dot formation.

According to another aspect of the present invention, an image printing method is provided whereby an edge emission type EL printer forms a plurality of flat pixel components crosswise to produce an approximately square pixel. This pixel is printed a plurality of times lengthwise and crosswise to form an image. Along the fringe of the image thus formed are suitably positioned what may be called smoothing pixels. Each of these pixels has some of its components left blank in its outer portion for visually smoothing effects. In the manner outlined above, this method reduces the serration at the inclined edge portions of the printed image for visually smoothing effects.

According to a further aspect of the present invention, an image printing method is provided whereby an edge emission type EL printer prints a plurality of flat pixel components crosswise to produce an approximately square pixel. This pixel is printed a plurality of times lengthwise and crosswise to form an image. Along the fringe of the image thus formed are suitably posiitoned what may be called intermediate print density pixels. These pixels have some of their components left blank to express intermediate print density. In the manner outlined above, this method reduces the serration at the inclined edge portions of the printed image for visually smoothing effects.

BRIEF DESCRIPTION OF THE DRAWINGS

FIG. 24 shows a line head adjacent to a photosensitive body.

DETAILED DESCRIPTION OF PREFERRED EMBODIMENTS

Figure 1A:
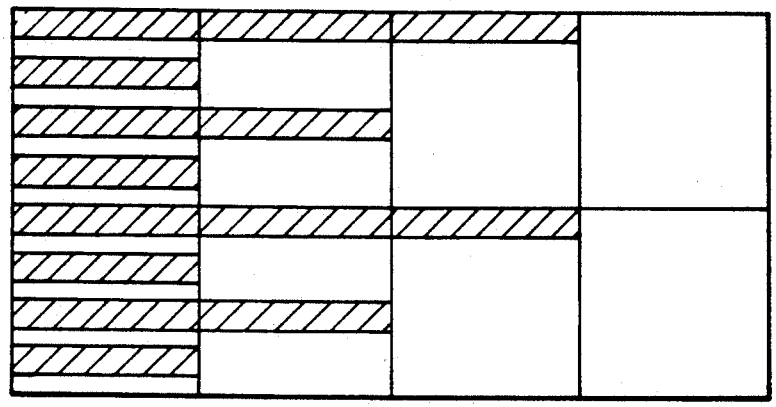
FIGS. 1(a) and 1(b) are views of images printed by use of a first embodiment of the present invention.
Figure 1B:
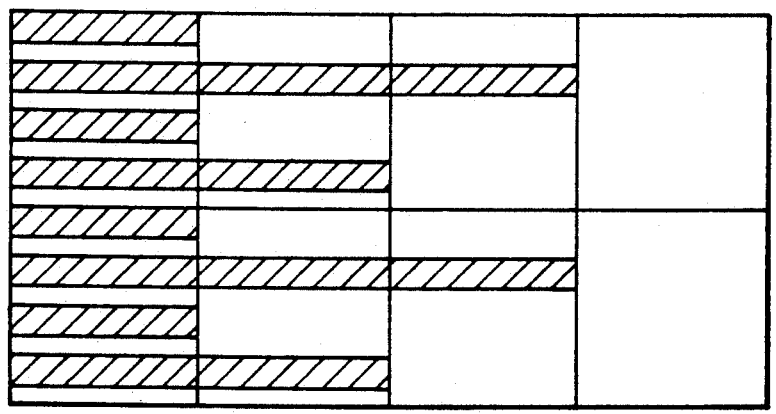

A first embodiment of the present invention will now be described by referring to FIGS. 1 through 4. The parts that are identical to those already described in connection with the prior art example are designated by the same reference characters, and any repetitive description thereof is omitted. A driving circuit of a line head 52 in an edge emission type EL printer 51 that is the first embodiment is the first to be described in reference to the block diagram of FIG. 4. An interface 58 is connected to a timing controller 60 via a control circuit 59. The timing controller 60 is connected to the line head 52 via a common driver 62 and via drivers $61_1$ through $61_4$ that are connected to block electrodes $54_1$ through $54_n$ as well as common electrodes $56_1$ through $56_m$. A data processing circuit 65 is connected to the drivers $61_1$ through $61_4$ via shift registers $63_1$ through $63_4$ and latches $64_1$ through $64_4$. The timing controller 60 is also connected to these parts 63 through 65.

Figure 2:
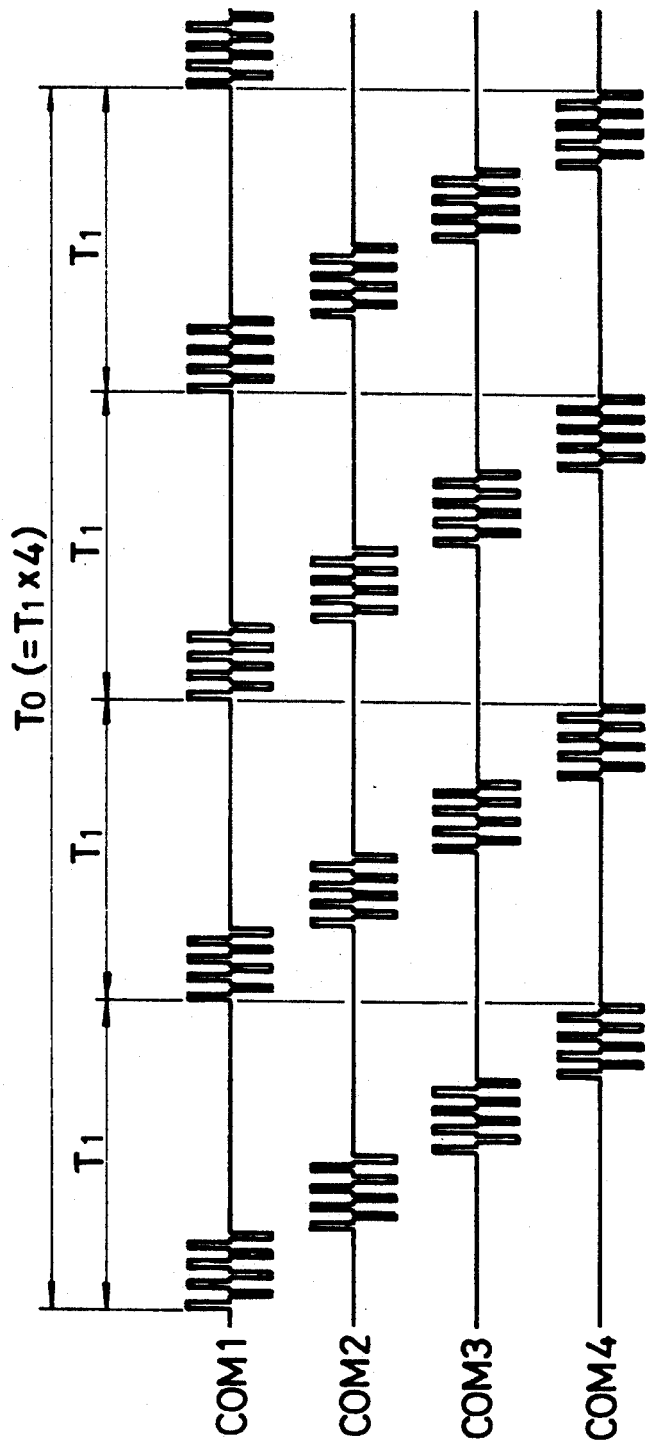
FIG. 2 is a timing chart associated with the first embodiment.
Figure 3:
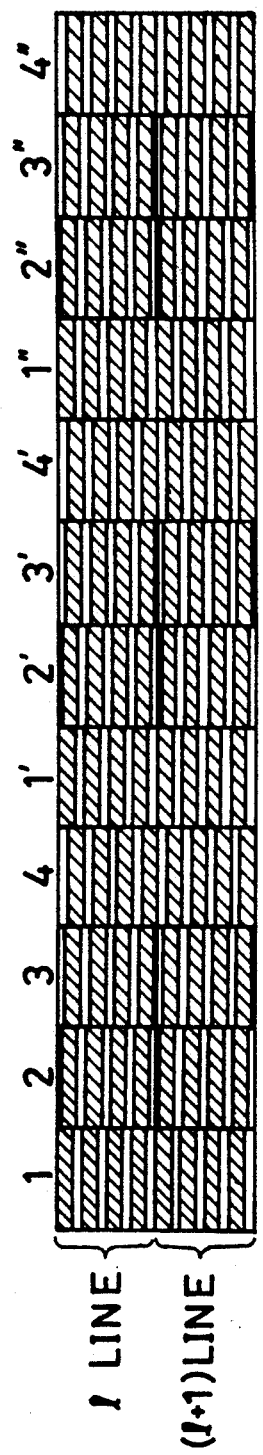
FIG. 3 is a view of an image printed by use of the first embodiment.
Figure 4:
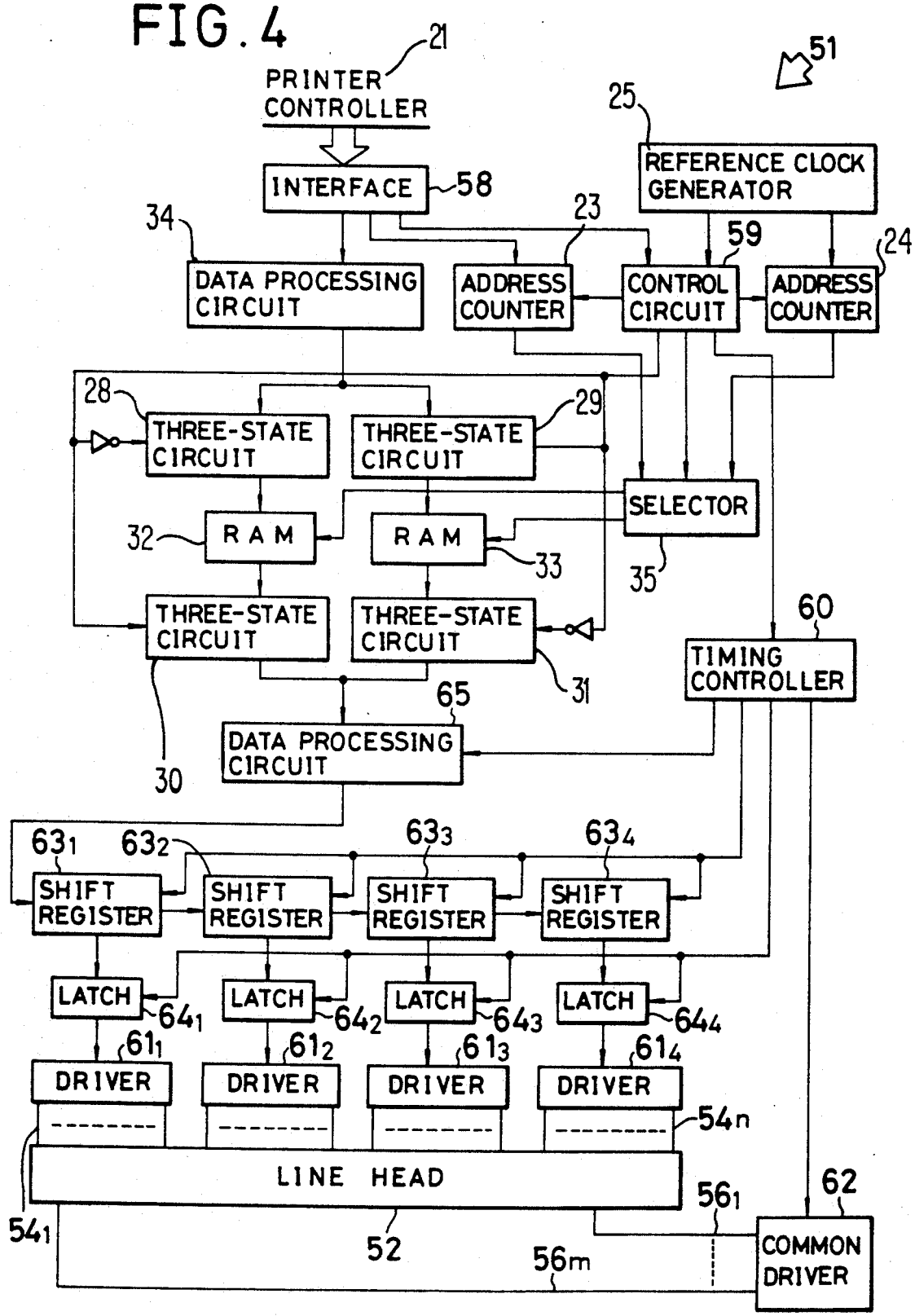
FIG. 4 is a block diagram of an edge emission type EL printer for use with the first embodiment.
Figure 14:
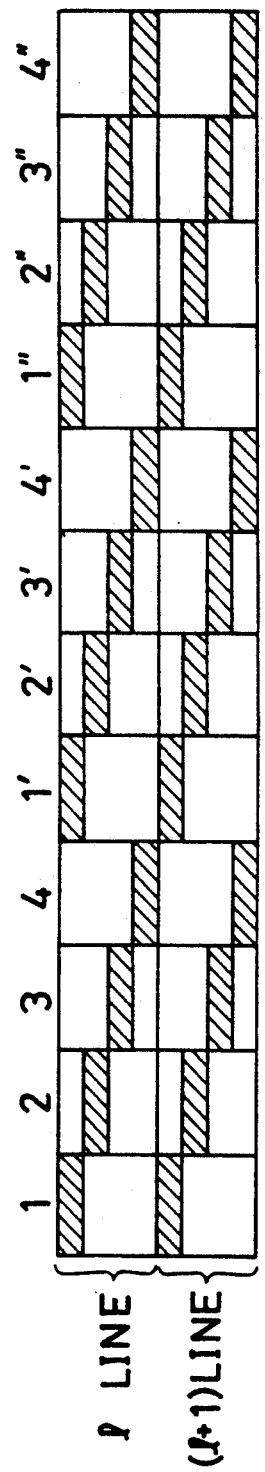
FIG. 14 is a view of an image printed by the prior art line printer.
Figure 15:
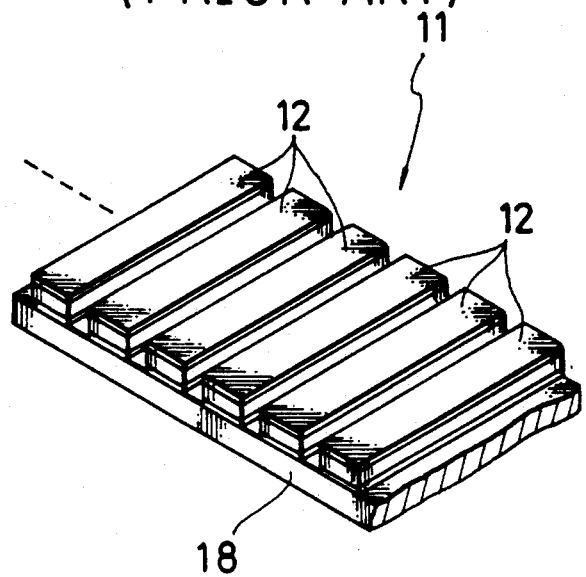
FIG. 15 is a perspective view of an array of different prior art edge emission type EL devices.
Figure 16:
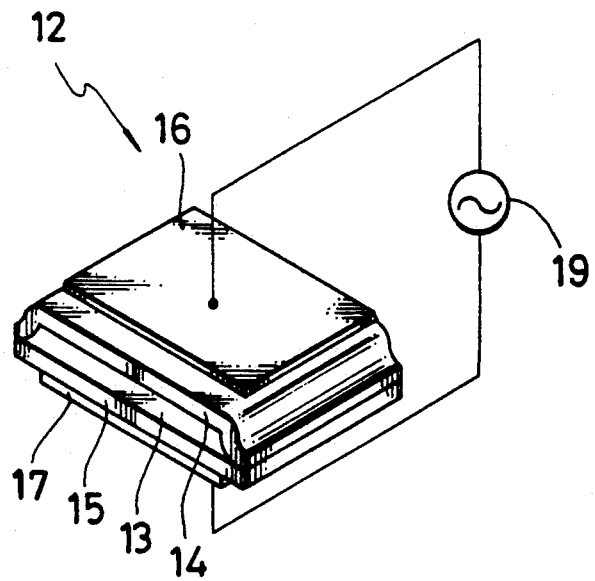
FIG. 16 is a perspective view of one of the EL devices.

Constructed as described above, the edge emission type EL printer 51 generates primary scanning lines as follows. A print signal admitted through the interface 58 is temporarily stored, compressed, and/or otherwise processed. The timing controller 60 outputs the print signal causing the line head 52 to perform line emission four times to produce one primary scanning line, as shown in FIG. 2. That is, the line head 52 repeats line emission four times during the time $T_0$ required to print one primary scanning line. The line thus printed has its serrated edge portions reduced to a quarter of those of the image illustrated in FIG. 14; the edges appear to be substantially flat.

It will be appreciated that the present invention is not limited to the number of times (i.e., four) the edge emission type EL printer 51 as the first embodiment performs line emission to produce one primary scanning line. Alternatively, the line emission count may be determined as needed by such factors as the responsiveness of edge emission type EL devices 2 and the sensitivity of the photosensitive drum. Furthermore, it is possible to increase the number of light emissions or to use a lens-based optical system concomitantly in order to overlay black portions within each dot so that solid black spots are obtained. As indicated, the edge emission type EL printer 51 performs line emission a plurality of times to produce one primary scanning line. The processing above may constitute what may be called an areal gradation printing method for recording intermediate degrees of print density.

How this areal gradation printing method works in connection with the edge emission type EL printer 51 will now be described by referring to FIG. 1. When one primary scanning line is formed from four line emissions, several grades of intermediate density ranging from white to solid black are available, as illustrated. That is, the line head is controlled to emit light four times for solid black, twice for density grade 1, and once for density grade 2; nonemission results in white. The emitted light forms pixels of rectangular bars, as shown in FIG. 1.

More specifically, an input print signal is interpreted by the data processing circuit 65 for individual pixel density; each signal corresponds to a specific grade of density it represents. In an example of FIG. 1(a), solid black is represented illustratively by a signal "1111," density grade 1 by "1010," density grade 2 by "1000" and white by "0000." In an example of FIG. 1(b), solid black is represented illustratively by a signal "1111," density grade 1 by "0101," density grade 2 "0100" and white by "0000." These density-specific signals are transmitted consecutively to the drivers 61 via the shift registers $63_1$ through $63_4$ and via the latches $64_1$ through $64_4$. In turn, the drivers 61 drive the line head in synchronization with the common driver 62 and under control by the timing controller 60.

Raising the number of line emissions for producing each primary scanning line increases the number of density grades that may be printed. The grade of intermediate print density is determined by the number of times line emission is carried out; there is no need to specify the exact position of each black spot to be printed. Thus it is possible to set a plurality of different patterns for the same grade of density, as described above. This areal gradation printing method for use with the edge emission type EL printer 51 has a high degree of freedom in expressing intermediate density grades.

A second embodiment of the present invention will now be described by referring to FIGS. 5 and 6. The image printing method of this embodiment relies on the hardware construction identical to that of the edge emission type EL printer 20 illustrated in FIG. 17. An approximately square pixel is formed by each edge emission type EL device 12 repeating its light emission four times.

Figure 5:
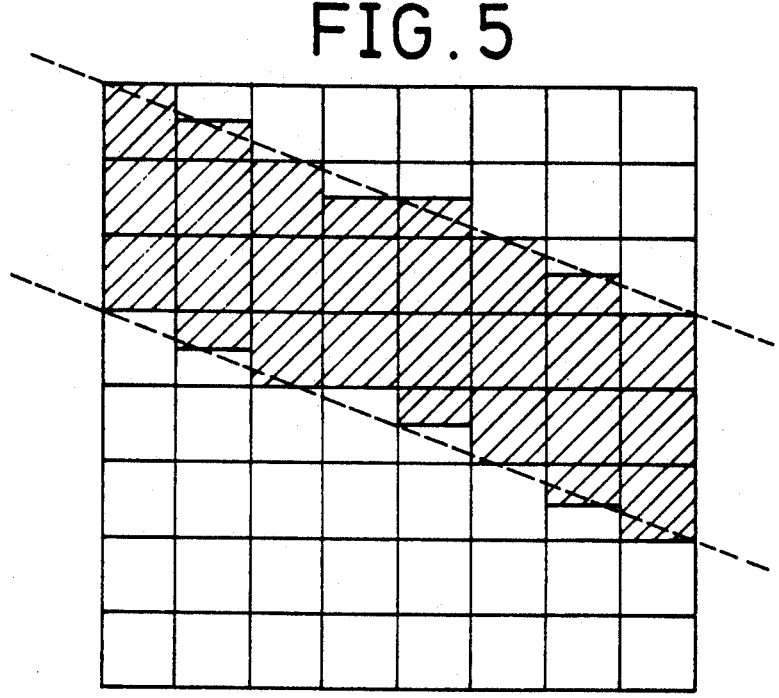
FIGS. 5 and 6 are views of images printed by use of a second embodiment of the present invention.
Figure 6A:
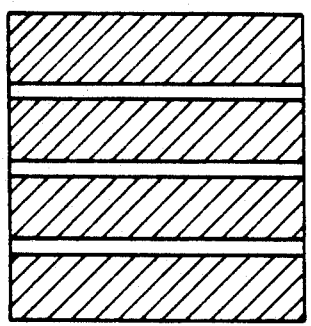
Figure 6B:
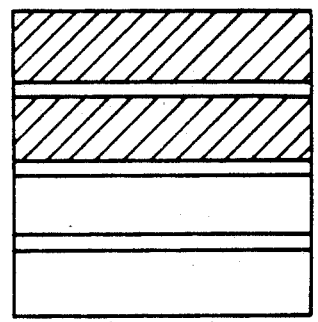
Figure 6C:
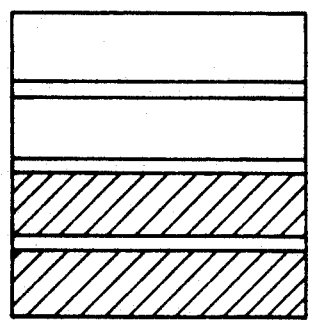
Figure 6D:
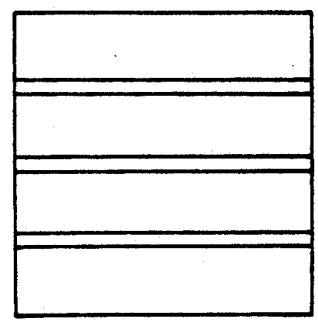

As depicted in FIG. 5, the image printing method of the second embodiment suitably positions, at image edges, smoothing pixels each of which has its outer pixel components left blank. This produces a visually pleasing image whose inclined edges are significantly freed of the conventionally experienced serration.

Figure 17:
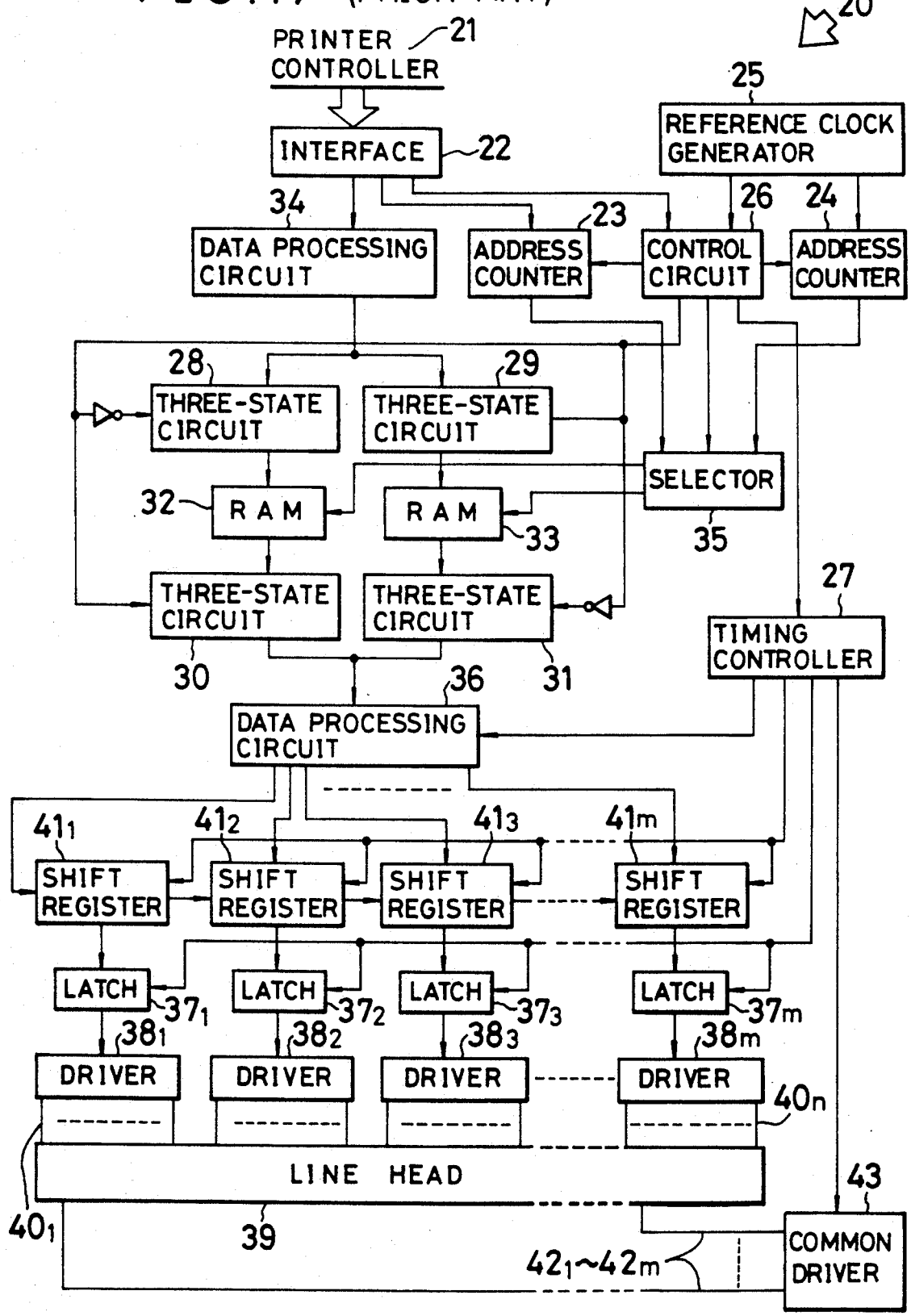
FIG. 17 is a block diagram of an edge emission type EL printer which was submitted by this applicant in Japanese Patent Appl. No. 1-97081.
Figure 18:
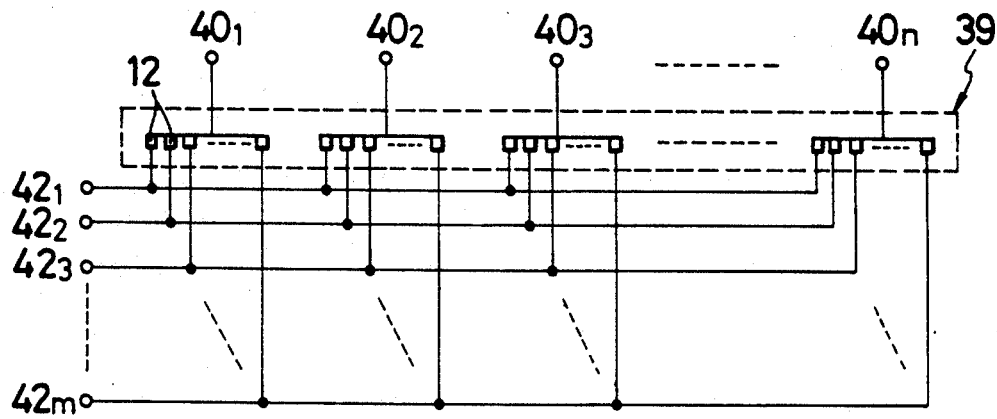
FIG. 18 is a view of a line head as it is wired in the edge emission type EL printer that the applicant submitted.
Figure 19:
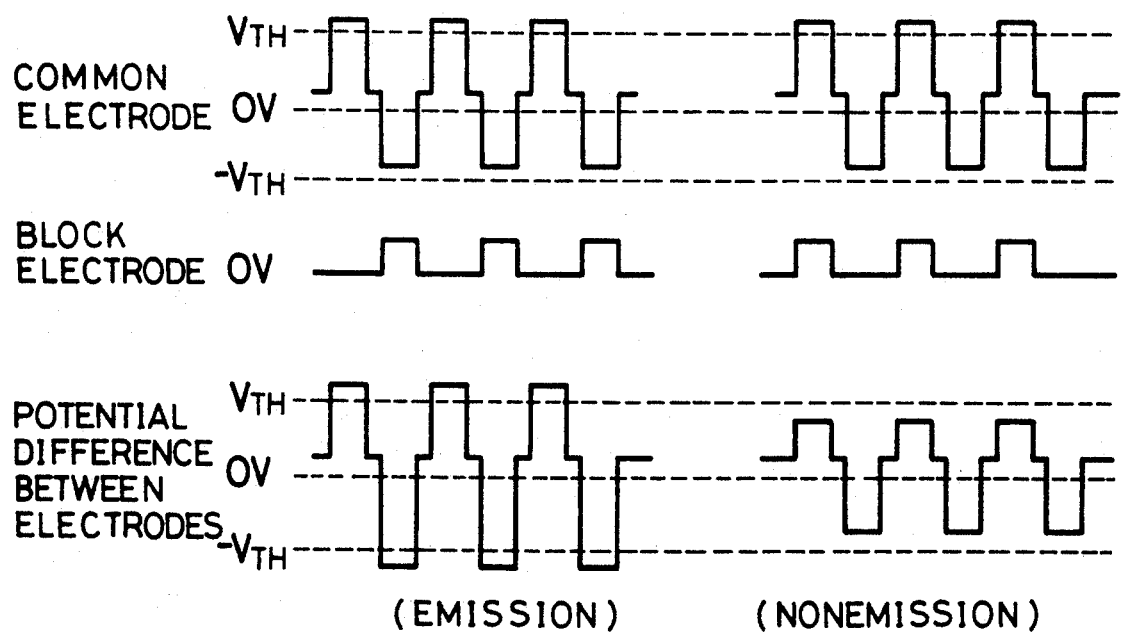
FIGS. 19 and 20 are timing charts associated with the edge emission type EL printer submitted by the applicant.
Figure 20:
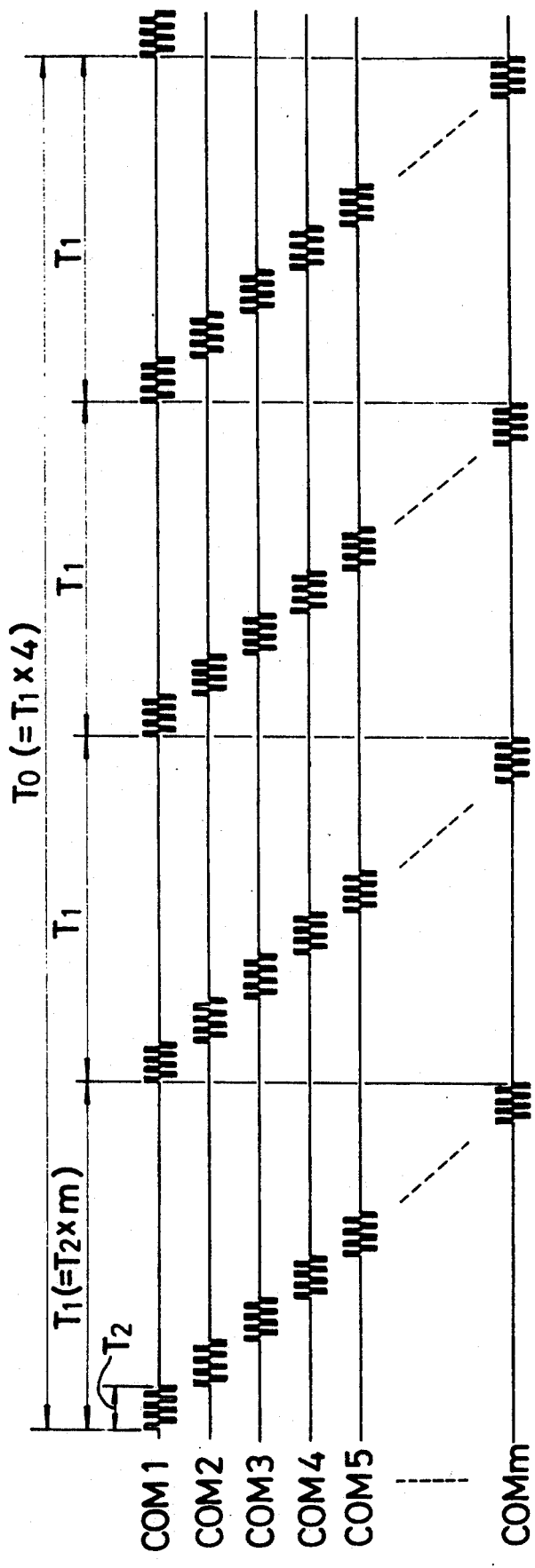
Figure 21:
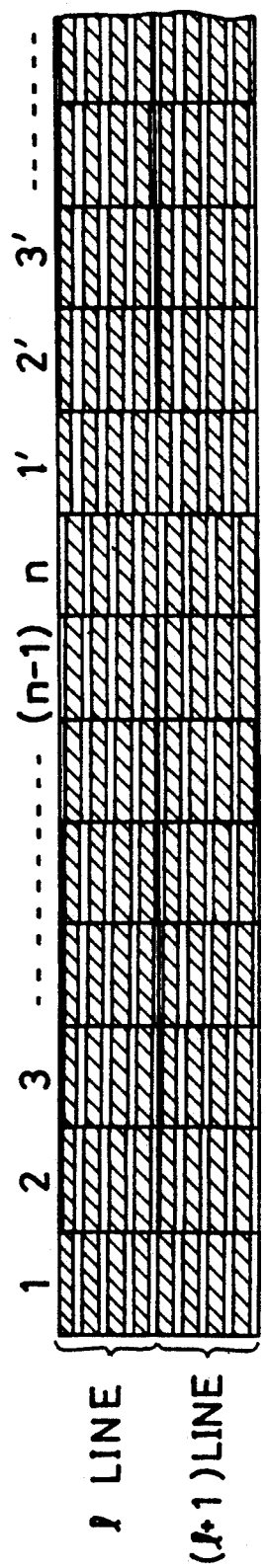
FIGS. 21 through 23 are views of images printed by the edge emission type EL printer submitted by the applicant.
Figure 22:
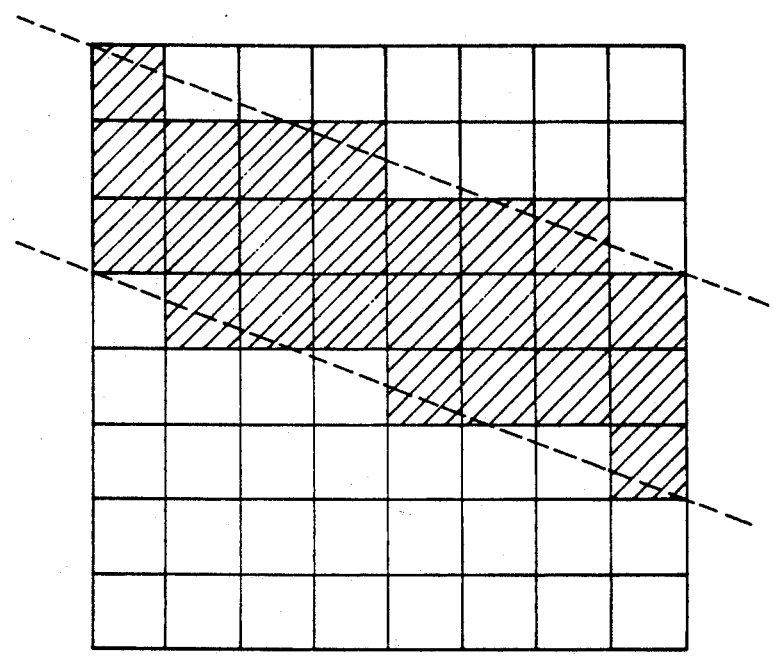
Figure 23:
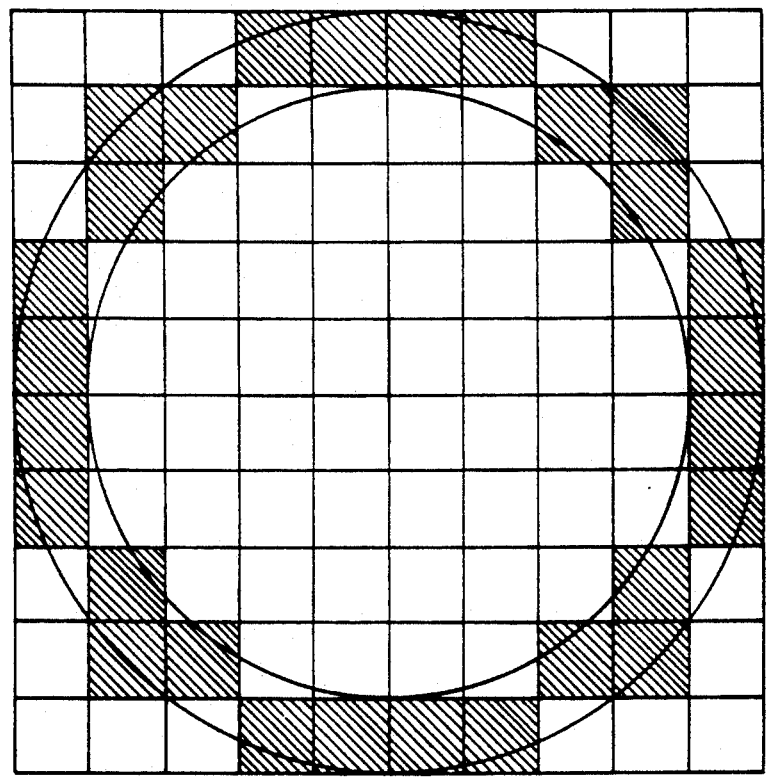

Referring now to FIG. 17 illustrating the edge emission type EL printer 20, print data when input is temporarily stored in the RAM's 32 and 33. A CPU, not shown, analyzes or otherwise operates on the data to find an image shape. Two-bit pixel data is assigned to each pixel. A solidly black pixel is formed by pixel data (1, 1) and a totally white pixel by (0, 0). In such cases, as with the prior art method, four light emissions from each EL device form an approximately square pixel. Where smoothing pixels are to be output to smooth out the serrated image edges, the pixel data is either (1, 0) or (0, 1) for each pixel. That is, the first or last two light emissions out of the total four for one secondary scan generate a smoothing pixel whose upper or lower half alone is filled with rectangular bar pixel components. These four different kinds of pixel are suitably positioned to print an image whose inclined edges are smoothed out as illustrated.

A third embodiment of the present invention will now be described by referring to FIGS. 7 and 8. The printing method of this embodiment involves utilizing those pixels of intermediate print density which have some of their components alternately removed and retained within their boundaries. These pixels replace the smoothing pixels used by the printing method of the second embodiment.

Figure 7A:
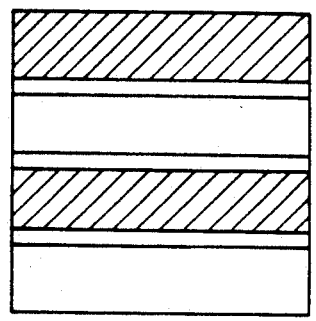
FIGS. 7 and 8 are views of images printed by use of a third embodiment of the present invention.
Figure 7B:
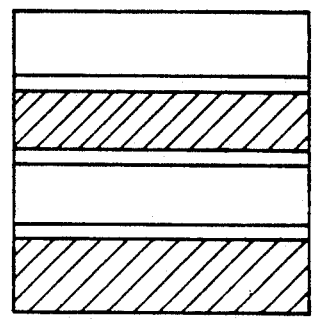
Figure 8:
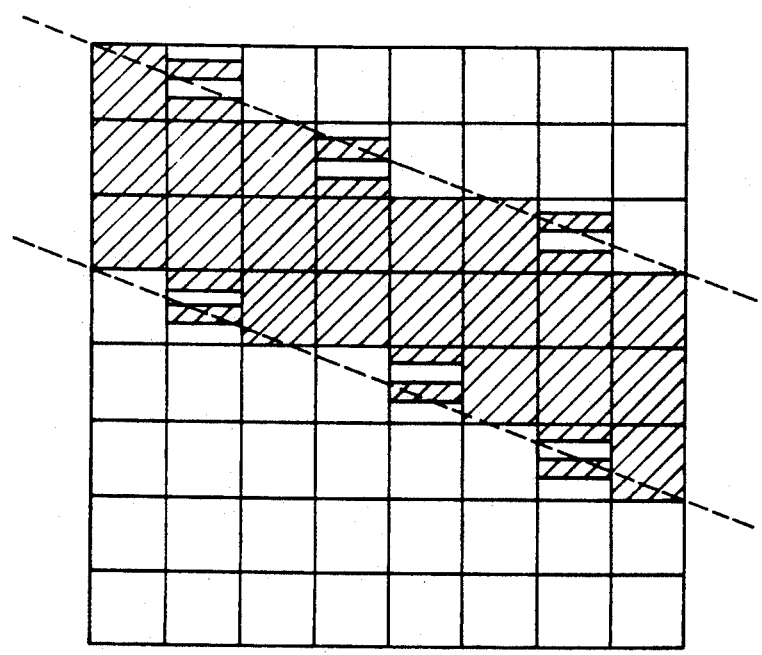
Figure 9:
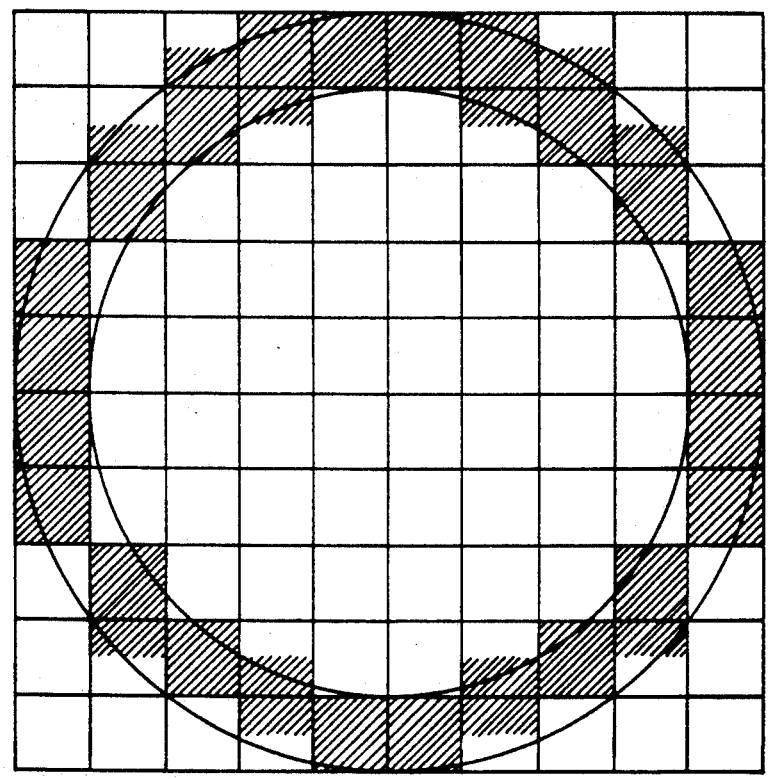
FIG. 9 is an image printed by use of a fourth embodiment of the present invention.

More specifically, as shown in FIG. 7, when the two-bit pixel data is (1, 0), the first and the third secondary scans out of the total four per pixel trigger light emission that prints a first (top) and a third (upper middle) pixel component as a rectangular bar in the pixel. When the two-bit pixel data is (0, 1), the second and the fourth secondary scans out of the total four cause a second (lower middle) and a fourth (bottom) pixel component as a rectangular bar in the pixel to be printed. Both pixels are pixels for intermediate print density.

During printing, these pixels of intermediate density are suitably combined with ordinary pixels that are either white or solid black. The result is a visually pleasing printed image whose edge serration is smoothed out, as illustrated in FIG. 8.

Figure 10:
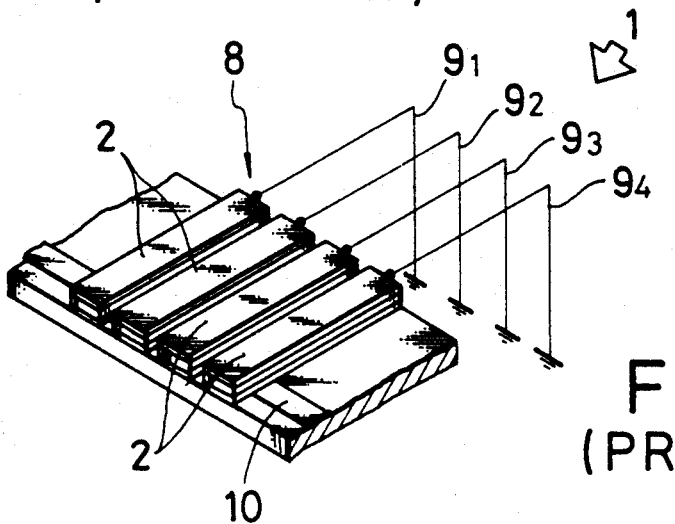
FIG. 10 is a perspective view of an array of prior art light-emitting devices for use with a prior art line printer.
Figure 11:
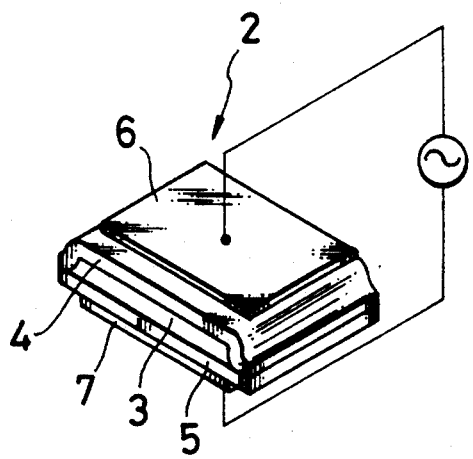
FIG. 11 is a perspective view of a prior art edge emission type EL device for use with the prior art line printer.
Figure 12:
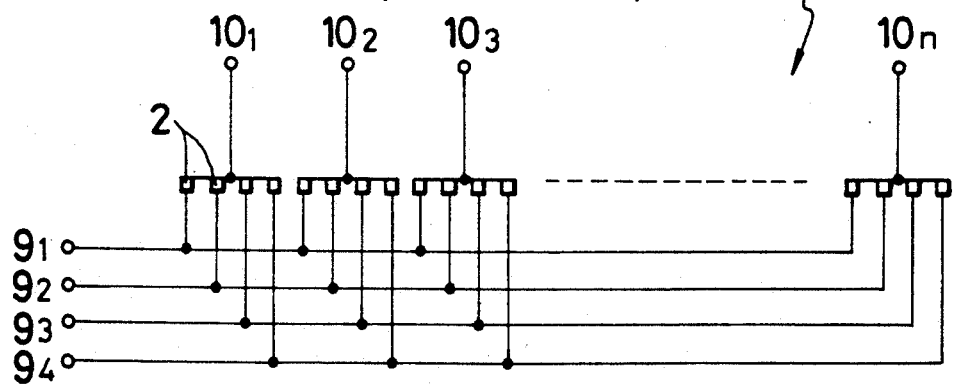
FIG. 12 is a circuit diagram of prior art edge emission type EL devices as they are wired in the prior art line printer.
Figure 13:
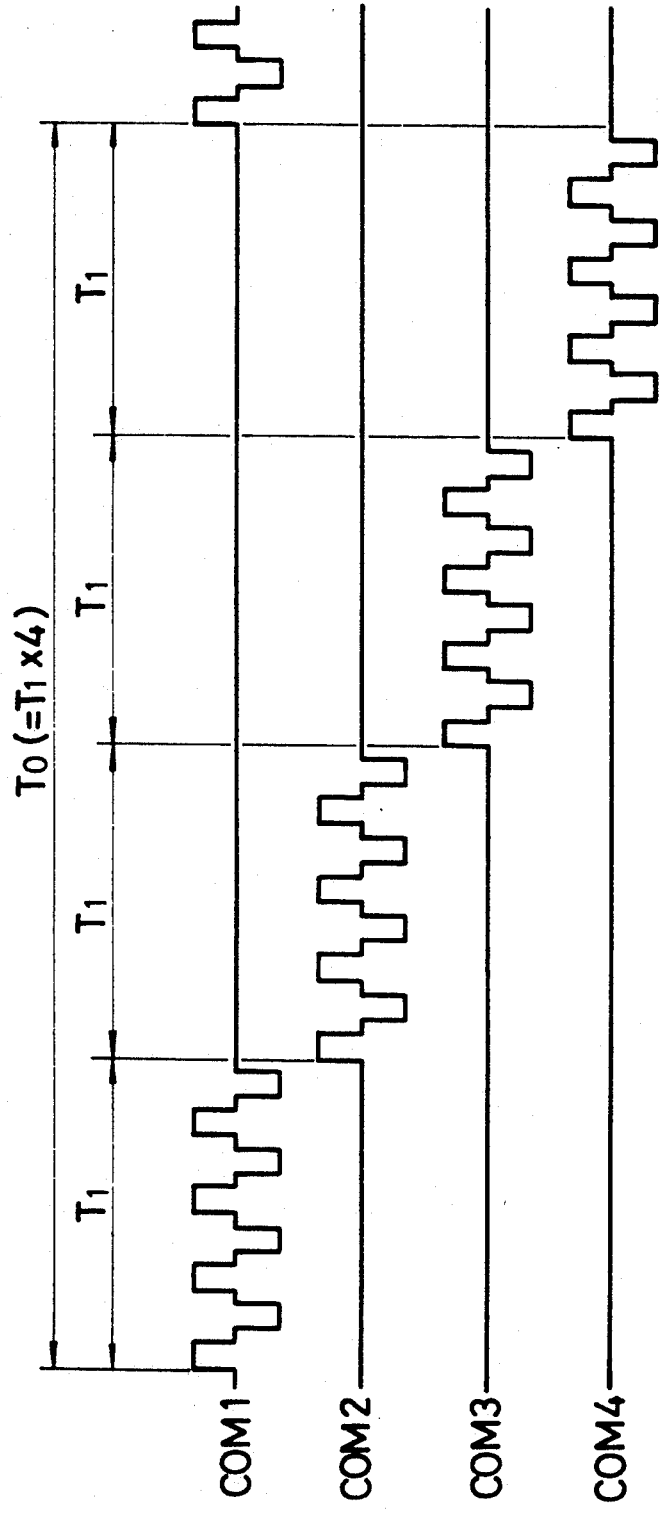
FIG. 13 is a timing chart associated with parts in the prior art line printer.

It is possible to additionally fill storage means such as ROM's, not shown, of the line printer containing character fonts with the smoothing and intermediate print density pixels described above. In this case, the added pixels are to be stored in units of two bits so as to be compatible with ordinary black and white pixels. As depicted in FIG. 10, a font of, say a character "0" made up of a 10×10 pixel matrix, has the serration of its inclined portions smoothed out and also maintains a visually pleasing continuity between line segments.

What is claimed is:

1. A method for printing with a line printer including a linear array of n blocks of m edge emission electroluminescent devices, each block of the m edge emission electroluminescent devices being connected to a separate block electrode and each emission electroluminescent device of the n blocks being connected to a separate common electrode, wherein the n blocks of the linear array are sequentially scanning in a primary scanning direction extending along a longitudinal axis of the linear array and each edge emission electroluminescent device corresponds to a pixel of a single print line, the method comprising the steps of:

positioning a photosensitive body adjacent to the line printer;

moving the photosensitive body relative to the line printer in a direction substantially perpendicular to the longitudinal axis of the linear array of the printer to provide a secondary scanning direction;

repeatedly energizing selected ones of the m edge emission electroluminescent devices as the n blocks of the array are sequentially scanned while the photosensitive body moves relative to the line printer so that each selected edge emission electroluminescent device emits radiant energy a selected number of times during printing of the single print line, each emission of radiant energy being for a same predetermined period of time and forming one of four different kinds of pixels formed of substantially rectangular bars having a longitudinal axis approximately perpendicular to the secondary scanning direction and comprising a first white pixel, a second dark pixel, a first density grade pixel having alternating rectangular bars of dark and white and a second density grade pixel having only a single dark rectangular bar; and controlling the selected number of times each selected edge emission electroluminescent device emits radiant energy to vary print density of the corresponding pixel of the single print line.

2. The method for printing with a line printer according to claim 1, wherein for the second density grade pixel, the single totally dark rectangular bar is formed at an edge of the pixel.

3. The method for printing with a line printer according to claim 1, wherein for the second density grade pixel, the single totally dark rectangular bar is formed at a central portion of the pixel.

4. A method for printing with a line printer including a linear array of n blocks of m edge emission electroluminescent devices, each block of the m edge emission electroluminescent devices being connected to a separate block electrode and each emission electroluminescent device of the n blocks being connected to a separate common electrode, wherein the n blocks of the linear array are sequentially scanning in a primary scanning direction extending along a longitudinal axis of the linear array and each edge emission electroluminescent device corresponds to a pixel of a single print line, the method comprising the steps of:

positioning a photosensitive body adjacent to the line printer;

moving the photosensitive body relative to the line printer to provide secondary scanning;

determining an image shape including a plurality of print lines;

repeatedly energizing selected ones of the m edge emission electroluminescent devices as the n blocks of the array are sequentially scanned while the photosensitive body moves relative to the line printer so that each selected edge emission electroluminescent device emits radiant energy a selected number of times in a selected sequence of energization during printing of a single one of said lines to form the corresponding pixel of the single print line as one of four different kinds of pixels, each pixel being formed of four rectangular bar portions, comprising a solidly dark pixel with all four rectangular bar portions dark, a totally white pixel with all four rectangular bar portions white, a first smoothing pixel having a top two rectangular bar portions solidly dark and a bottom two rectangular bar portions white and a second smoothing pixel having a top two rectangular bar portions white and a bottom two rectangular bar portions solidly dark; and controlling the selected number of times and the selected sequence of energization that each selected edge emission electroluminescent device emits radiant energy to suitably position the four different kinds of pixels to print the image shape with smoothed out serrated edges.

5. A method for printing with a line printer including a linear array of n blocks of m edge emission electroluminescent devices, each block of the m edge emission electroluminescent devices being connected to a separate block electrode and each emission electroluminescent device of the n blocks being connected to a separate common electrode, wherein the n blocks of the linear array are sequentially scanning in a primary scanning direction extending along a longitudinal axis of the linear array and each edge emission electroluminescent device corresponds to a pixel of a single print line, the method comprising the steps of:

positioning a photosensitive body adjacent to the line printer;

moving the photosensitive body relative to the line printer in a direction substantially perpendicular to a longitudinal axis of the linear array of the line printer to provide a secondary scanning direction;

determining an image shape including a plurality of print lines;

repeatedly energizing selected ones of the m edge emission electroluminescent devices as the n blocks of the array are sequentially scanned while the photosensitive body moves relative to the line printer so that each selected edge emission electroluminescent device emits radiant energy a selected number of times in a selected sequence of energization during printing of a single one of said lines to form the corresponding pixel of the single print line as one of several different kinds of pixels comprising a solidly dark pixel, a totally white pixel, a first smoothing pixel having an intermediate print density comprising alternating rectangular bars of totally white and solidly dark with an upper portion being a rectangular bar of totally white, and a second smoothing pixel having an intermediate print density comprising alternating rectangular bars of totally white and solidly dark with an upper portion being a rectangular bar of totally dark, a longitudinal axis of each of the rectangular bars being positioned substantially perpendicular to the secondary scanning direction; and controlling the selected number of times and the selected sequence of energization that each selected edge emission electroluminescent device emits radiant energy to suitably position the several different kinds of pixels to print the image shape with smoothed out serrated edges.

* * * * *

UNITED STATES PATENT AND TRADEMARK OFFICE
CERTIFICATE OF CORRECTION

PATENT NO. : 5,241,324
DATED : 8/31/93
INVENTOR(S) : Toshiyuki Tamura et al

It is certified that error appears in the above-indentified patent and that said Letters Patent is hereby corrected as shown below:

On the title page, after the Abstract, "13 Drawing Sheets" should be changed to --14 Drawing Sheets--.

The sheet of drawing consisting of Fig. 24, should be added as shown on the attached page.

Signed and Sealed this

Twenty-first Day of December, 1993

Attest:

BRUCE LEHMAN

Attesting Officer   Commissioner of Patents and Trademarks

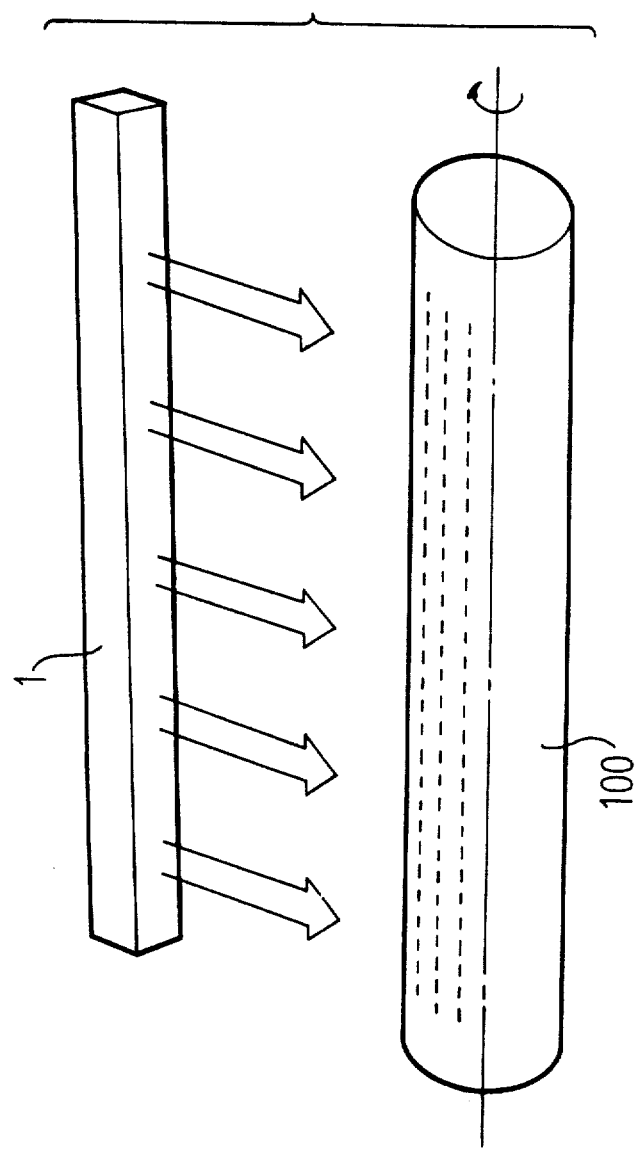
F I G. 24